J. G. VINCENT.
HYDROCARBON MOTOR.
APPLICATION FILED OCT. 14, 1912.
1,265,145.
Patented May 7, 1918.
3 SHEETS—SHEET 1.
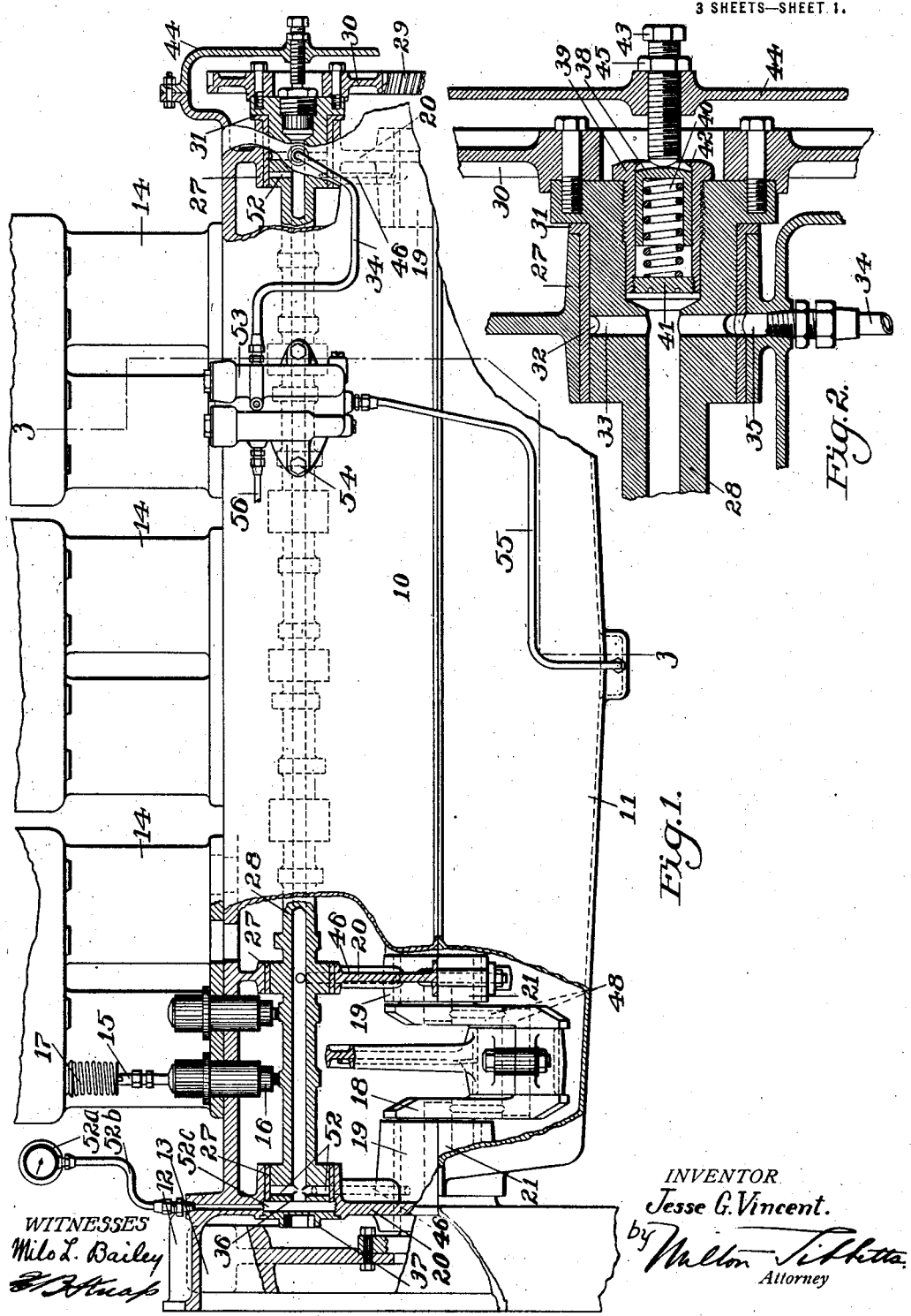

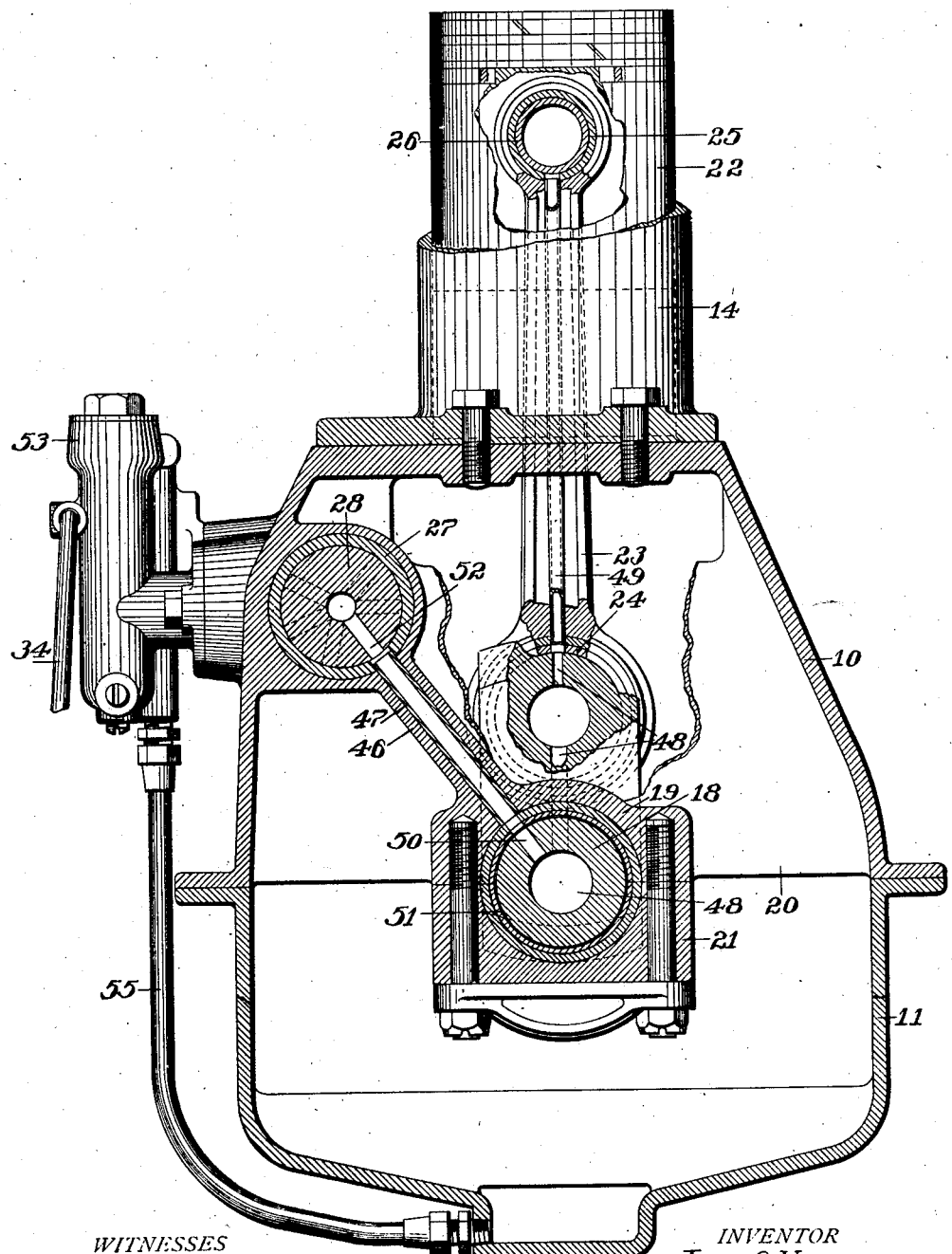

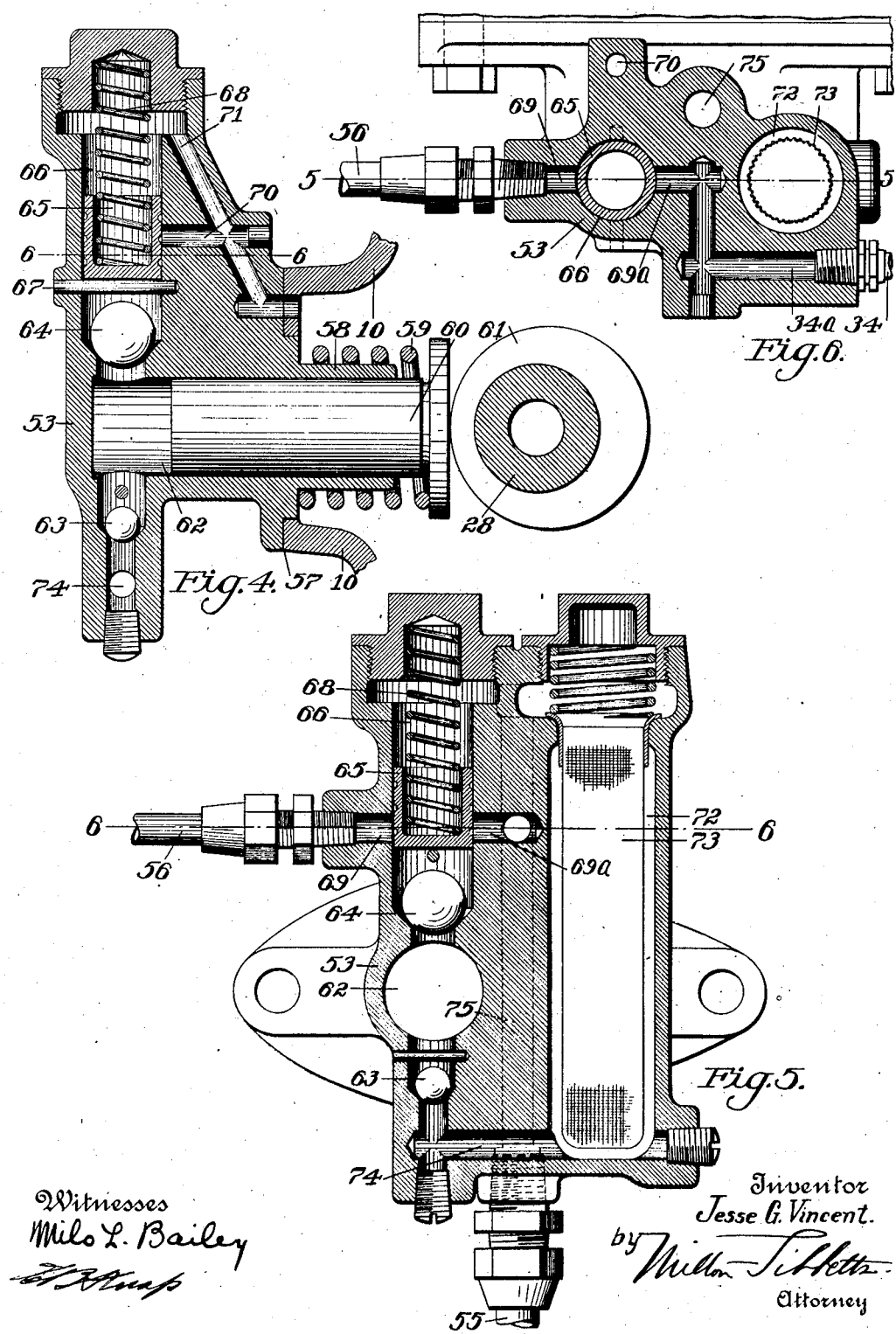

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,265,145.   Specification of Letters Patent.   Patented May 7, 1918.

Application filed October 14, 1912. Serial No. 725,741.

*To all whom it may concern:*

Be it known that I, JESSE G. VINCENT, a citizen of the United States, and resident of Detroit, Wayne county, State of Michigan, have invented certain new and useful Improvements in Hydrocarbon-Motors, of which the following is a specification.

This invention relates to hydrocarbon motors and particularly to means for lubricating the various bearings of the motor.

One of the objects of my invention is to produce a simple oiling system in which most of the pipes or conduits are arranged within the motor itself.

Another object of the invention is to employ the motor valve operating or cam shaft as a conduit and a distributer for the lubricating oil to the various crank shaft and connecting rod bearings.

Another object of the invention is to utilize the oil pressure system against the end of the valve operating shaft to resist the end thrust thereon, due to the valve being driven through helical gears.

Another object of the invention is the production of a suitable pump to furnish the required flow of oil.

Other objects will be apparent from the description, taken in connection with the drawings, in which, Figure 1 is a side elevation and part longitudinal sectional view of a hydrocarbon motor embodying the invention.

Fig. 2 is an enlarged section of the front end of the valve operating shaft,

Fig. 3 is a transverse vertical section of the motor, approximately on the line 3—3 of Fig. 1, Fig. 4 is a transverse vertical section of the oil pump, Fig. 5 is a vertical section of the pump, approximately on the line 5—5 of Fig. 6, and Fig. 6 is a horizontal sectional view on the line 6—6 of Figs. 4 and 5.

Referring to the drawings, 10 indicates the crank case or supporting base of a hydrocarbon motor having a bottom cover 11, and rearward extension 12, forming a casing for the fly wheel 13. The motor cylinders 14 are shown as cast in pairs and mounted on the crank case, the motor shown comprising six vertical cylinders. One of the valves is shown at 15, operated by the valve lifter 16 and the spring 17.

To the fly wheel 13 is secured the motor crank shaft 18, having in the present instance, seven main bearings 19, which are formed in transverse webs 20 of the crank case 10, the bearings being supported and secured to the webs by bearing blocks 21.

Connecting each of the six cranks of the crank shaft 18 with its respective piston 22, is a connecting rod 23, its big end having a bearing 24 on the crank shaft and its smaller end having a bearing 25 on the piston pin 26.

Also mounted in the seven bearings 27 of the webs 20, is a valve operating shaft or cam shaft 28, which extends parallel to the crank shaft and is driven therefrom through helical gears 29—30, thus producing end thrusts on cam shaft 28, which may be taken in part by the plain thrust bearing 31.

The cam shaft 28 is shown as being drilled throughout its length, thus forming a conduit for the lubricating oil that is supplied to it by the pump, to be hereinafter described. At its forward bearing 27, shaft 28 has a circumferential groove 32, from which lead two or more transverse holes 33 to the interior of the shaft. A pipe or conduit 34, leading from a suitable pump, supplies oil under pressure through the bearing 27 at 35, to the groove 32, and from here the oil passes through the holes 33 to the interior of the shaft. Thus the hollow shaft is kept constantly full of oil under pressure, and as its rear end 36 is opposed by the abutment 37, the oil pressure within the shaft tends to force the shaft forwardly against the end thrust exerted upon it by the gears 29—30. Thus considerable of the end thrust is taken from the plain bearing 31 and the rotating shaft floats in its bearings.

In case of the oil pressure within the cam shaft overcoming the rearward end thrust of the helical gears, the forward end thrust of the shaft may be taken by a spring plunger 38, sliding in a thimble 39, secured in the forward end of the cam shaft. This plunger is backed by a spring 40, secured in the thimble by a removable plug 41, and an internal flange 42 retains the plunger in the thimble until the bolt or abutment 43 in the forward cover 44 is secured in place. This bolt 43 is preferably adjustable, to give the required tension to the spring 40, and is provided with a lock nut 45, as will be seen particularly in Fig. 2. It will be understood that the plunger 38 rotates with a point contact on the end of the bolt 43 with very little friction.

Formed in each of the webs 20, is a diagonally arranged conduit 46, leading from the cam shaft bearings to the corresponding crank shaft bearings, and as the crank case is usually made of cast aluminum, which is more or less porous, these conduits are lined with a tube 47 of different material, such as brass.

The crank shaft 18 is also drilled out, forming conduits 48, leading to the connecting rod bearings, and a small pipe or conduit 49 leads from the lower connecting rod bearing 24 to the piston pin bearing 25. Also at its main bearings, the crank shaft has radial holes 50, which are adapted to register at each revolution with the respective conduits 46, so that oil supplied under pressure to the said conduits 46 will enter the crank shaft main bearings and be distributed to them by circumferential grooves 51, and any excess of oil will pass through the hole 50 to the interior of the crank shaft, from thence to the connecting rod bearings 24 through conduits 48, and from thence to the piston pin 26 through conduits 49. Of course it will be understood that oil will be squeezed out through all of these bearings during the operation of the motor, and will be thrust from the various revolving and reciprocating parts and collected at the bottom of the crank case in the sump formed by the bottom cover 11.

It has been shown above how oil is supplied to the interior of the cam shaft 28 under pressure, and upon reference to Figs. 1 and 3, it will be seen that the cam shaft is provided with a radial hole 52 at each of its bearings, these holes being arranged at angles to each other, the present cam shaft having seven bearings, and the holes being arranged equi-distant, as shown particularly in Fig. 3. One of the holes is shown in full lines, and five of them in dotted lines, the seventh hole is omitted because the line on which Fig. 3 is taken is at the rear of the forward cam shaft bearing.

It will be understood that each of these holes 52 registers during each revolution of the cam shaft with its respective conduit 46, so that oil under pressure is distributed by means of the cam shaft 28 to the various conduits 46 in succession, not more than one conduit being supplied at a given time, so that the pressure is maintained in the distributing cam shaft.

One of the advantages of this method of distribution is that should one of the crank shaft bearings become loose, so that the oil would readily leak through it, the other bearings would still receive their full quota of oil, by reason of the fact that the loose bearing is connected with the distributing cam shaft at intervals only, and not simultaneously with any of the other crank shaft bearings.

The pressure gage 52ª is connected by a suitable pipe 52ᵇ with the space 52ᶜ between the rear end 36 of the cam shaft and the abutment 37. This gage gives the pressure at the extreme rear end of the cam shaft, so that the minimum pressure within the cam shaft is the pressure registered, the oil being supplied to the extreme forward end of the cam shaft. This is of considerable advantage to the operator in that he is always aware of the minimum pressure within the oiling system.

In Fig. 1 the oil pump 53 may be seen in elevation as secured to the side of the crank case 10, as by bolts 54. A pipe 55 leads from the bottom of the crank case or sump to the intake side of the pump, and the pipe 34, hereinabove described, leads from the pump to the forward bearings 27 of the cam shaft, where the oil is carried to the interior of the cam shaft by the groove 32 and holes 33. Another pipe 56 leads from the delivery end of the pump to any desired auxiliary system, none being shown in the drawings.

The oil pump is particularly illustrated in Figs. 4, 5 and 6, and consists of a cast metal body, faced off at 57 to fit the crank case 10, and provided with a boss 58 extending into the crank case and surrounded by a spring 59 controlling a pump plunger 60. This plunger 60 is thus spring pressed against a cam or eccentric 61 formed on the cam shaft 28. The plunger 60 operates in the bored out cylinder portion 62 of the pump and the valves 63 and 64 control the intake and outlet respectively, of the pump.

The pump is further provided with a control valve in the form of a piston 65, sliding in a cylindrical casing 66 and normally held against the stop 67 by spring 68. When the piston is in the position shown in the drawings, it closes entirely the outlet ports 69 and 69ª of the pump, but a slight pressure against the piston raises it and permits the oil to escape, and a greater pressure causes the piston to rise farther and exposes the overflow port 70, which returns the excess oil to the crank case, as will be seen particularly in Fig. 4. Another overflow passage 71 is provided above the piston 65 for returning to the crank case any oil that may escape past the piston.

In the pump body there is also formed a cylindrical casing 72, in which is supported a screen or strainer 73, through which the oil must pass to reach the pump. A passage 74 leads from the cylinder portion 72 to the intake valve 63 of the pump. There is also a passage 75 leading vertically through the pump body to the top of the cylinder portion 72. Thus the oil will pass from the intake pipe 55, through the passage 75 to the strainer 73; and through the cylinder portion 72 and passage 74, to the intake valve 63; thence through the pump and outlet valve 64, to the outlet port 69 and 69ᵃ, passage 34ᵃ, and pipes 34 and 56.

It will be seen that all of the parts of the pump are readily removable for inspection and cleaning.

Having thus described my invention, what I claim and desire to secure by Letters Patent, is:

1. In a motor the combination with a crank case having two sets of bearings of a drilled out crank shaft mounted in one of said sets of bearings and a drilled out cam shaft mounted in the other of said sets of bearings, means for feeding oil under pressure to one of said shafts and a conduit connecting said shafts whereby the oil fed to one shaft is fed to the other.

2. In a motor the combination with the crank case having bearings of a drilled out crank shaft mounted in said bearings, a hollow tube having radial openings therein mounted in said crank case, a pump for supplying oil under pressure to said tube and conduits connecting the openings in said tube with the crank shaft bearings to supply oil thereto.

3. In a motor the combination with the crank case having a series of transverse webs therein, a series of bearings for the crank shaft arranged in said webs, a hollow tube mounted in said webs parallel to said crank shaft and having radial openings therein at said mounting points, conduits in said webs leading from said radial openings to said crank shaft bearings and means for forcing oil into said hollow tube and thence through said conduits to said crank shaft bearings.

4. In a hydrocarbon motor the combination with the crank case having bearings, of a crank shaft mounted in said bearings, a hollow oil distributing shaft, means for feeding oil into said shaft and means for feeding oil from said oil distributing shaft to said crank shaft bearings.

5. In a hydrocarbon motor the combination with the crank case having bearings of a crank shaft mounted in some of said bearings, a hollow oil distributing shaft mounted in other of said bearings means for feeding oil into said shaft and means for feeding oil from said oil distributing shaft to said crank shaft and oil distributing shaft bearings.

6. In a hydrocarbon motor the combination with the crank case having bearings, of a crank shaft mounted in said bearings, a hollow oil distributing shaft, a pump driven by said crank shaft for feeding oil to said distributing shaft and means for feeding oil from said oil distributing shaft to said crank shaft bearings.

7. In a hydrocarbon motor the combination with the crank case having a series of transverse webs therein, a series of bearings for the crank shaft arranged in said webs a series of bearings for the valve operating shaft arranged in said webs conduits in said webs leading from said valve shaft bearings to the respective crank shaft bearings said valve shaft being hollow and having radial distributing openings, and a pump forcing oil to the interior of the valve shaft whereby it may be distributed to the various bearings.

8. In a hydrocarbon motor the combination with the crank case having a series of transverse webs therein, a series of bearings for the crank shaft arranged in said webs, an oil distributing shaft, a series of bearings for the oil distributing shaft arranged in said webs, conduits in said webs leading from oil distributing shaft bearings to the respective crank shaft bearings, said oil distributing shaft being hollow and having radial distributing openings, and a pump forcing oil to the interior of the oil distributing shaft whereby it may be distributed to the various bearings.

9. In a motor, the combination with a hollow valve operating shaft having radial distributing openings, of means for feeding oil under pressure to the interior of said shaft, and means for conveying oil from said openings to the motor crank shaft bearings.

10. In a motor, the combination with a hollow valve operating shaft having radial distributing openings, of a pump operated by said shaft for feeding oil to the interior of said shaft, and conduits leading from said openings to the crank shaft bearings of the motor.

11. In a motor, the combination with an oil distributing shaft, means for feeding oil under pressure to said shaft at one end thereof, and a pressure gage operatively connected to said shaft at the other end thereof.

12. In a motor, the combination with an oil distributing shaft, means for feeding oil under pressure to said shaft at one end thereof, means for conveying oil from said shaft intermediate its ends, and a pressure gage operatively connected to said shaft at the other end thereof.

13. In a motor, the combination with the crank case, of a crank shaft mounted in several bearings therein, a hollow valve operating shaft mounted parallel with the crank shaft in several bearings in the crank case, said valve shaft having radial distributing holes at its several bearings, conduits leading from the valve shaft bearings to the respective crank shaft bearings, and means for feeding oil under pressure to the interior of said valve shaft whereby it may be distributed through said conduits to the crank shaft bearings.

14. In a motor, the combination with the crank case, of a crank shaft mounted in several bearings therein, a hollow valve operating shaft mounted parallel with the crank shaft in several bearings in the crank case, said valve shaft having radial distributing holes at its several bearings, conduits leading from the valve shaft bearings, and so arranged relative to the respective distributing holes that the various conduits register with the holes at different times in the rotation of the shaft, said conduits leading to the respective crank shaft bearings, and means for feeding oil under pressure to the interior of said valve shaft whereby it may be distributed through said conduits to the crank shaft bearings.

15. In a motor, the combination with the crankcase having bearings for the crankshaft and the camshaft, and having a conduit extending between a bearing of each of said shafts, of a crankshaft mounted in its bearings, a camshaft in its bearings, said camshaft being drilled throughout its length to form a conduit for oil, and means for feeding oil through the conduit to the bearings.

16. In a motor, the combination with the crankcase having bearings for the crankshaft and the camshaft, and having a conduit extending between a bearing of each of said shafts, of a crankshaft mounted in its bearings, a camshaft in its bearings, said camshaft being drilled in a right line throughout its length to form a conduit for oil, and means for feeding oil through the conduit to the bearings.

17. In an internal combustion engine, a hollow shaft having port openings therein, means for supplying oil under pressure thereto, bearings for said shaft having port openings communicating with the parts to be lubricated, and means for causing said openings to register one at a time with the port openings in the shaft.

18. In an internal combustion engine, a hollow rotating cam shaft having port openings therein, means for supplying oil under pressure thereto, bearings for said shaft having port openings communicating with the parts to be lubricated, and adapted to register one at a time with the port openings in the shaft.

In testimony whereof I affix my signature in the presence of two witnesses.

JESSE G. VINCENT.

Witnesses:
O. E. HUNT,
R. M. HIDEY.